(12) United States Patent
Fortain et al.

(10) Patent No.: US 6,586,700 B2
(45) Date of Patent: Jul. 1, 2003

(54) PROCESS FOR THE MIG WELDING OF ALUMINUM AND ITS ALLOYS WITH A SHIELDING GAS OF THE AR/HE/O₂ TYPE

(75) Inventors: Jean-Marie Fortain, Osny (FR); Philippe Lefebvre, Saint Ouen l'Aumone (FR); Jean-Yves Mouton, Cergy Pontoise (FR); Gerard Plottier, Pierrefitte (FR)

(73) Assignee: L'Air Liquide - Société Anonyme á Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 09/886,138

(22) Filed: Jun. 22, 2001

(65) Prior Publication Data

US 2002/0036186 A1 Mar. 28, 2002

(30) Foreign Application Priority Data

Jun. 22, 2000 (FR) .............................. 00 08018

(51) Int. Cl.⁷ .............................................. B23K 9/173
(52) U.S. Cl. ................................. 219/74; 219/137 WM; 219/137 PS
(58) Field of Search .................... 219/74, 137 WM, 219/137 PS; 228/219; 252/372

(56) References Cited

U.S. PATENT DOCUMENTS

| | | | | |
|---|---|---|---|---|
| 4,071,732 A | | 1/1978 | Tanaka et al. | 219/137 R |
| 4,463,243 A | * | 7/1984 | Church | 219/74 |
| 4,529,863 A | * | 7/1985 | Lebel | 219/137.42 |
| 4,626,646 A | * | 12/1986 | Hilton | 219/74 |
| 4,912,299 A | * | 3/1990 | Oros et al. | 219/137 PS |
| 6,111,218 A | * | 8/2000 | Matile et al. | 219/137 PS |
| 6,384,376 B1 | * | 5/2002 | Plottier et al. | 219/130.51 |
| 6,392,194 B1 | * | 5/2002 | Fortain et al. | 219/137 PS |
| 6,437,288 B1 | * | 8/2002 | Lefebvre et al. | 219/137 WM |

FOREIGN PATENT DOCUMENTS

| | | | | |
|---|---|---|---|---|
| EP | 0 207 019 A2 | * | 12/1986 | B23K/35/38 |
| EP | 0 442 475 | | 8/1991 | B23K/9/16 |
| EP | 0 639 423 | | 2/1995 | B23K/9/173 |
| EP | 0 639 423 A1 | * | 2/1995 | B23K/9/173 |

* cited by examiner

Primary Examiner—M. Alexandra Elve
Assistant Examiner—Kevin P. Kerns
(74) Attorney, Agent, or Firm—Young & Thompson

(57) ABSTRACT

For MIG welding, either in a spray mode without current modulation or in a pulsed mode, of aluminum and aluminum alloys, with the use of a gas shield for at least part of the welding zone, the gas shield is a gas mixture consisting, by volume, of from 0.01% to 1.80% oxygen and from 15% to 98.2% helium, and any balance being argon.

20 Claims, 4 Drawing Sheets

PROCESS FOR THE MIG WELDING OF ALUMINUM AND ITS ALLOYS WITH A SHIELDING GAS OF THE AR/HE/O₂ TYPE

FIELD OF THE INVENTION

The present invention relates to a MIG (Metal Inert Gas) process for the electric-arc welding of aluminum and aluminum alloys, either in a pulsed mode or in a spray mode without modulated current.

BACKGROUND OF THE INVENTION

The MIG electric-arc welding process is widely used in industry, including that of welding aluminum.

Shielding gases play an essential role in the performance of this process.

Thus, argon does not allow high welding speeds and may give rise, in automatic welding, to arc instabilities above 500 A. The characteristic shape of the narrow penetrations obtained with argon in spray mode is ill-suited to welding by interpenetration.

Moreover, argon/helium (hereafter Ar/He) mixtures and helium by itself make it possible to increase the depth of penetration and its root width, and hence make it possible to dispense with expensive preparations, the more so the higher the helium content in the Ar/He mixtures.

In other words, for a constant thickness, helium therefore allows welding speeds which increase with its content.

However, although the compactness of the beads is also generally improved by the presence of helium, this is to the detriment of the appearance of the beads, which are less shiny than with pure argon.

Ar/He mixtures therefore present an appreciable advantage in terms of quality and productivity, both in manual welding (for example for a mixture of the Ar/20% He type) and in automatic welding (for example for mixtures of the Ar/50% to 70% He type) with, however, a not insignificant cost associated with the helium content.

For applications not necessarily having to meet these two criteria, it may be judicious to consider other types of mixtures.

Thus, document EP-A-639 423 proposes, for TIG and MIG processes, to use a welding gas of the argon or argon/helium type containing, furthermore, from 100 to 1000 ppm by volume of $CO_2$ and/or $O_2$.

Furthermore, document DE-A-4241982 proposes to use argon or an Ar/He mixture to which has also been added from 80 to 250 ppm by volume of nitrogen.

Document EP-A-442 475 recommends welding with a consumable electrode using a gas mixture consisting of 0.5 to 1.25 vol % carbon dioxide, 30 to 40 vol % helium and the balance being argon.

Document U.S. Pat. No. 4,071,732 relates to a mixture formed from an inert gas containing less than 30% carbon dioxide or less than 5% oxygen; however, the examples in this document describe only mixtures of argon and carbon dioxide with contents of about 5 or 15%.

It should be emphasized that in terms of increasing the performance, none of these processes is fully satisfactory from the industrial standpoint.

Furthermore, in modulated spray MIG welding, that is to say with the welding current being modulated, it has already been recommended to use a shielding gas or gas mixture formed from argon, helium or mixtures thereof, to which from 0.01% to 1.80% of carbon dioxide and/or oxygen have been added, as described in EP-A-909 604. However, in this case, current modulations at a frequency of less than 60 Hz are applied to the current so as to be able to degas the weld puddle in order to remove gaseous inclusions therefrom, particularly diffusable hydrogen, liable to be found therein. This is because MIG processes in spray mode with current modulations are used when it is desired to obtain a high quality of the welded joint, but without actually needing to achieve a high welding speed.

Consequently, the problem that arises is to improve the known MIG welding processes not using modulation of the welding current, particularly MIG processes in unmodulated spray mode, that is to say without modulation of the welding current, and processes in pulsed mode, so as to be able to obtain high performance levels in terms of productivity and welding speed.

This is because MIG processes in unmodulated spray mode (without modulation of the current) and those in pulsed mode are much more suitable when it is desired to improve productivity rather than quality, that is to say the appearance of the welds.

Hitherto, MIG processes in unmodulated mode or in pulsed mode are used little or not at all for welding aluminum or its alloys when the gas shield contains oxygen.

This is because it is usually recognized that the presence of oxygen in the gas shield may have a deleterious effect on the weld given that, when oxygen is incorporated into the gas shield, the oxygen can easily combine with aluminum atoms and result in solid inclusions of alumina ($Al_2O_3$) in the weld, which have a negative effect on the mechanical properties of said weld. Moreover, this has been confirmed for high oxygen contents, that is to say oxygen contents greater than 2%, and for high carbon dioxide contents, that is to say, again, contents greater than 2%.

However, conversely, the presence of oxygen in the shielding gas stream results in productivity performance levels which are acceptable from the industrial standpoint.

It therefore follows that the problem that arises is to provide an MIG welding process for aluminum and its alloys resulting both in a high and industrially acceptable productivity and a low level of alumina inclusions in the weld without a major or appreciable impact on the mechanical properties of the welded joints.

SUMMARY OF THE INVENTION

The solution provided by the present invention therefore relies on a process for MIG welding, in spray mode without current modulation or in pulsed mode, of aluminum and aluminum alloys, with the use of a gas shield for at least part of the welding zone, wherein the gas shield is a gas mixture consisting of from 0.01% to 1.80% oxygen and from 20% to 98.2% helium, any balance consisting of argon.

Further characteristics of the process of the invention are given below:

- the shielding gas contains from 0.9% to 1.80% oxygen and from 15% to 98.20% helium, the balance being argon;
- the shielding gas mixture contains at least 1% oxygen, preferably at least 1.1% oxygen, more preferably at least 1.2% oxygen;
- the shielding gas mixture contains at most 1.70% oxygen, preferably at most 1.65% oxygen;
- a solid meltable wire is used;
- the welding speed is from 0.25 m/min. to 1.20 m/min., preferably from 0.60 to 1 m/min.;
- the wire speed is from 2.5 m/min. to 20 m/min., preferably from 4 m/min. to 17 m/min.;
- the mean welding current is from 40 A to 450 A and/or the mean welding voltage is from 15 V to 40 V;
- the process is in pulsed mode and/or the welding current is from 120 A to 350 A and/or the mean welding voltage is from 20 V to 30 V;
- the process is in spray mode and/or the welding current is from 180 A to 450 A and/or the mean welding voltage is from 20 V to 39 V.

The present invention therefore relies on precise control of the oxygen content in the helium or an argon/helium mixture, it being necessary for the maximum oxygen content not to exceed about 1.80%, the gas mixture thus formed constituting the gas shield used when implementing the MIG process.

It should be emphasized that any MIG process in spray mode with modulation of the welding current is excluded from the invention.

BRIEF DESCRIPTION OF THE DRAWINGS

The invention will now be more clearly explained by means of the following examples, given by way of illustration but implying no limitation, the results of which are shown schematically in the figures appended hereto.

DETAILED DESCRIPTION OF THE INVENTION

In order to show the effectiveness of the MIG process according to the invention, several comparative trials were carried out.

Within the context of these trials, aluminum workpieces (5000 and 6000 grades according to the NFEN 485, 487, 515 and 573 standards) were welded using an MIG process in unmodulated spray mode and in pulsed mode, using a gas shield consisting of argon to which from 1 to 1.5% $O_2$ was added.

The current generator was a 480 TR16 generator sold by La Soudure Autogene Française.

The meltable wire used as filler metal was, in all cases, a wire 1.2 mm in diameter of the 5356 type (according to the AWS A5.10 or NF A50.403 standards).

Prior to welding, the aluminum workpieces were prepared by mechanical gouging.

The other welding parameters are given in Table I below, in which:

$V_{wire}$ represents the feed speed of the meltable wire;

$I_p$ represents the intensity of the peak current;

$I_b$ represents the base current;

$I_{mean}$ represents the mean current;

$U_p$ represents the peak voltage;

$U_{mean}$ represents the mean voltage;

$F_{pulse}$ represents the current pulse frequency (in pulsed MIG mode);

$T_{pulse}$ represents the current pulse time (in pulsed MIG mode).

TABLE I

| Welding parameters for the two transfer modes | | |
|---|---|---|
| Mode | Spray | Pulsed |
| Grade of the aluminum workpiece | 5000 | 5000 |
| Thickness (mm) | 6 | 6 |
| $V_{wire}$ (m/min.) | 12.5 | 9 |
| $I_p$ (A) | — | 330 |
| $I_b$ (A) | — | 110 |
| $I_{mean}$ (A) | 220–240 | 154–162 |
| $U_p$ (V) | — | 28 |
| $U_{mean}$ (V) | 21–23 | 20–23 |
| $F_{pulse}$ (Hz) | — | 155 |
| $T_{pulse}$ (ms) | — | 1.6 |

The results obtained are given below, after evaluating the performance in terms of productivity (welding speed) and joint quality (compactness and appearance of the bead) and mechanical properties.

Figure 1:
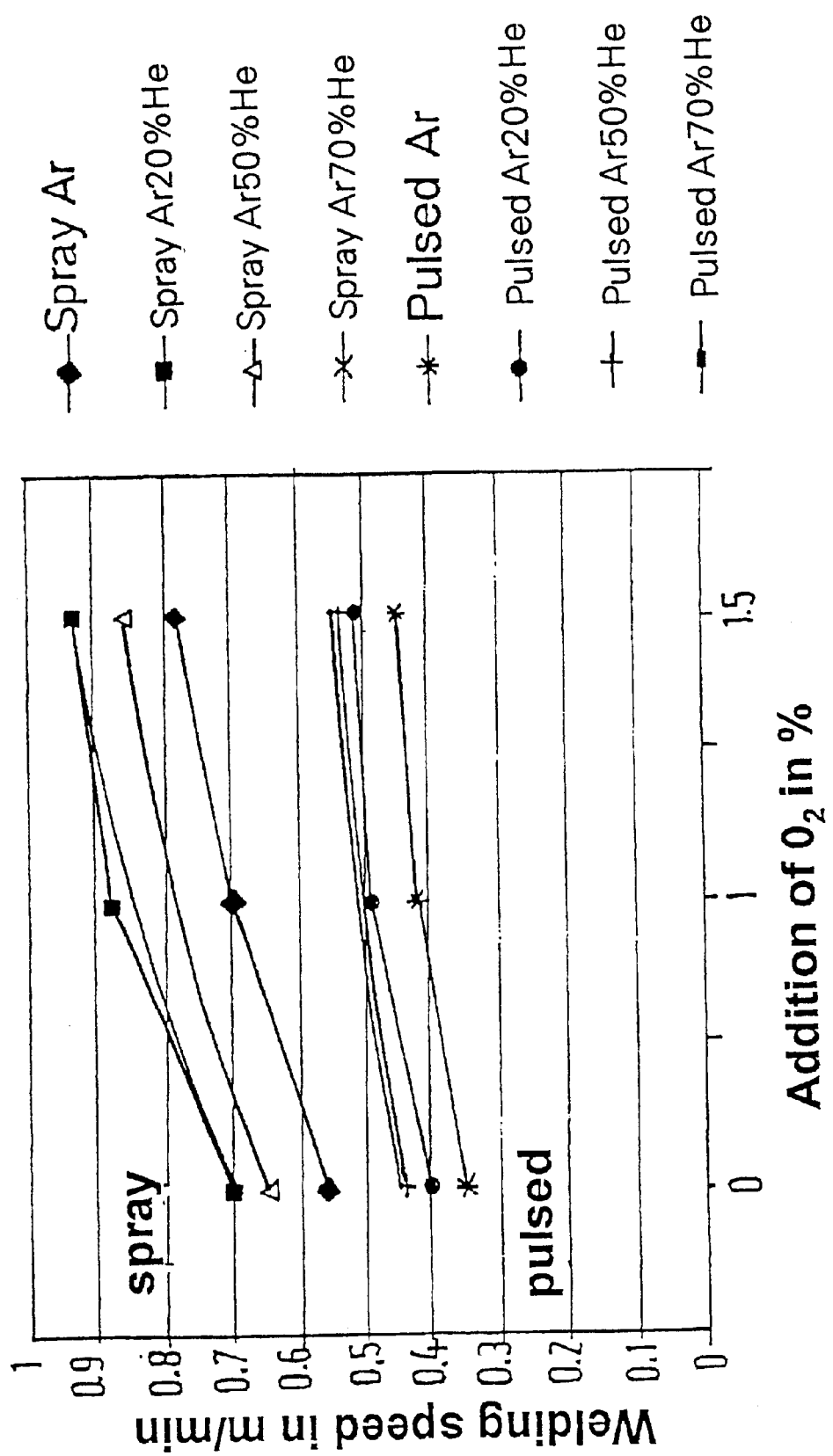
FIG. 1 shows the influence of adding oxygen to argon and various argon/helium mixtures with respect to welding speed.

In Table II below, the increases in speed given for the 5000 grade were determined with respect to the welding speeds for various argon/helium mixtures and with or without the addition of $O_2$ and, by way of comparison, the results obtained with argon to which $O_2$ was added, have also been given. These results are shown diagrammatically in FIG. 1.

It may be seen that for identical $O_2$ additions, the increase in performance, in terms of welding speed and in terms of penetration, remains equivalent for an Ar/He mixture and for argon alone.

TABLE II

Increase in performance in terms of welding speed for 5000 grade with respect to an Ar/He mixture without the addition of $O_2$.

| Mode | Spray | | | | Pulsed | | | |
|---|---|---|---|---|---|---|---|---|
| Gas | Ar | Ar/20% He | Ar/50% He | Ar/70% He | Ar | Ar/20% He | Ar/50% He | Ar/70% He |
| 0% $O_2$ | 0.56 | 0.7 | 0.65 | 0.7 | 0.35 | 0.4 | 0.44 | 0.45 |
| +1% $O_2$ | 0.7 | 0.88 | n.d. | n.d. | 0.42 | 0.49 | n.d. | n.d. |
|  | 25% | 25.7% | n.d. | n.d. | 20% | 22.5% | n.d. | n.d. |
| +1.5% $O_2$ | 0.78 | 0.93 | 0.86 | 0.93 | 0.45 | 0.52 | 0.54 | 0.55 |
|  | 39.2% | 32.8% | 32.3% | 32.8% | 28.5% | 30% | 22.7% | 22.2% |

Welding speed ($V_w$): in m/min.;
Speed increase: in %;
n.d.: not determined.

Table II shows an increase in the welding speed for a weld with perfect penetration for a thickness of 6 mm.

Moreover, in order to evaluate the performance in terms of joint quality (compactness and appearance of the bead), X-ray examinations were carried out on the 5000-grade workpieces, which did not reveal any indications other than those normally encountered in MIG with argon or Ar/He mixtures.

The corresponding intrinsic values and the joint coefficients (strength of the melted metal/strength of the basis metal) are indicated in Table III.

It will be noted that there is no significant degradation in the mechanical properties of the melted zone depending on the increase in the $O_2$ content. The maximum recorded reduction of 7 N/mm$^2$ (i.e. −2.6%) in spray mode with an Ar/He mixture remains less than that recorded for the same transfer mode with Ar/$O_2$, namely 15 N/mm$^2$ (i.e. −5.5%).

TABLE III

Mechanical properties on 5086-series assembles for Ar/He mixtures with addition of $O_2$

| Mode | | Spray | | | Pulsed | | |
|---|---|---|---|---|---|---|---|
| Gas | | Ar/20% He | Ar/50% He | Ar/70% He | Ar/20% He | Ar/50% He | Ar/70% He |
| 0% $O_2$ | $R_m$ (MPa) | 271.12 | 263.2 | 266.47 | 265.03 | 266 | 264.03 |
|  | Joint coeff. | 0.86 | 0.83 | 0.84 | 0.84 | 0.84 | 0.83 |
| +1% $O_2$ | $R_m$ (MPa) | 269.92 | n.d. | n.d. | 267.05 | n.d. | n.d. |
|  | Joint coeff. | 0.85 | n.d. | n.d. | 0.84 | n.d. | n.d. |
| +1.5% $O_2$ | $R_m$ (MPa) | 264.72 | 260.12 | 259.71 | 266.61 | 266.4 | 261.68 |
|  | Joint coeff. | 0.84 | 0.82 | 0.82 | 0.84 | 0.84 | 0.83 |
|  | BM actual/ guaranteed $R_m$ (MPa) | | | 315/275 | | | |

Complementarily, macrographic samples made it possible to reveal, by simple polishing, areas of reduced-size (about 0.01 mm) inclusions of different distribution and orientations.

These areas were identified in a scanning electron microscope as areas of alumina ($Al_2O_3$). Furthermore, the appearance of the beads obtained with Ar/He/$O_2$ mixtures was substantially different from those produced with an Ar/He mixture: the beads have a surface deposit which is blackish depending on the retained $O_2$ content, which is removed by brushing or with the aid of a rag.

Figure 2:
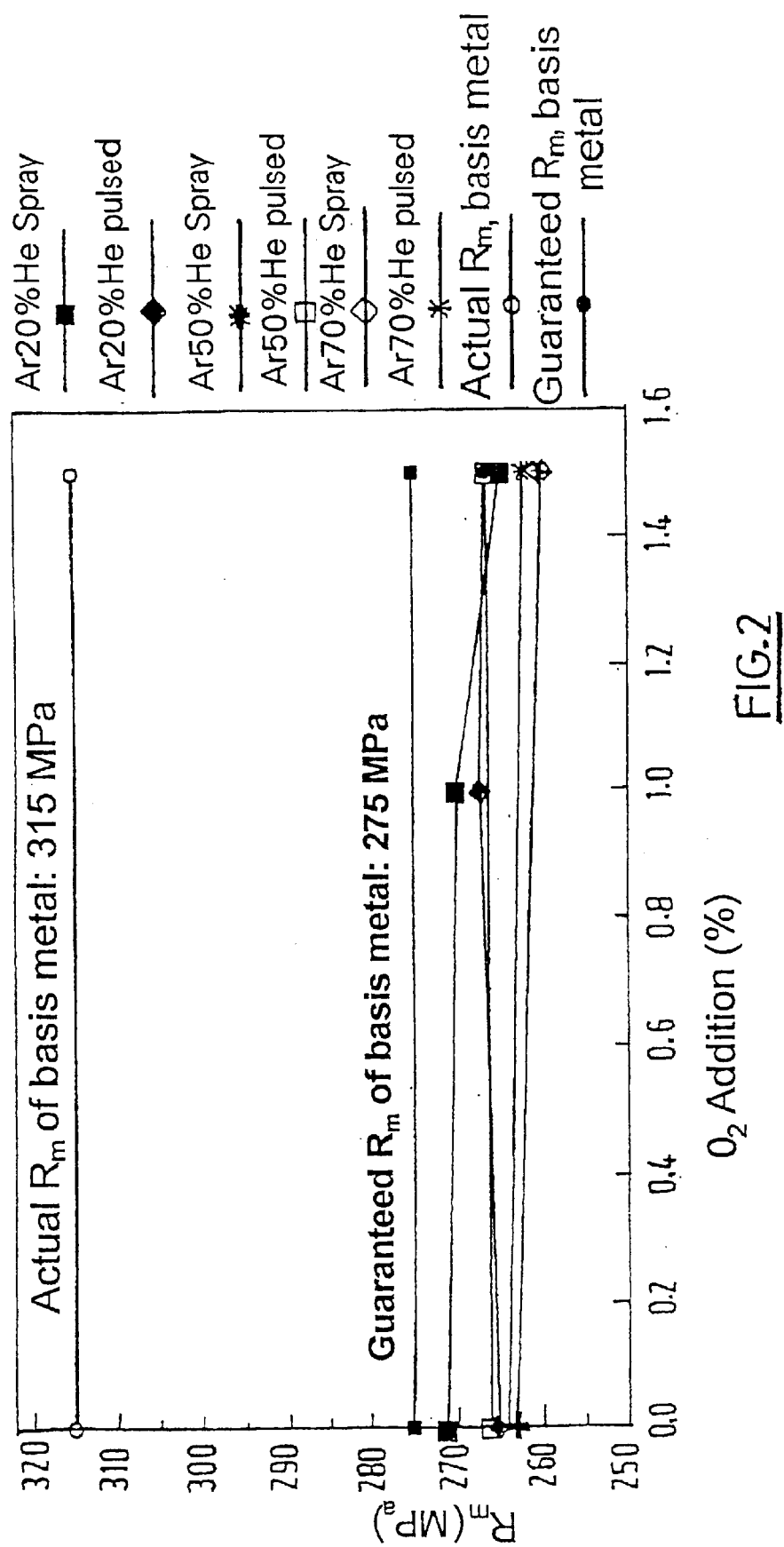
FIG. 2 shows the influence of adding oxygen to various argon/helium mixtures with respect to tensile strength.

Next, the mechanical properties were determined from leveled transverse tensile and transverse bending test pieces. The tensile results are shown in FIG. 2 in which the x-axis represents the $O_2$ contents in the three Ar/He mixtures of different compositions and the y-axis represents the tensile strength (Rm) values (in MPa) of the 5000-grade assemblies.

All the tensile test pieces (having a thickness of 6 mm) systematically fractured in the melted metal, which is normal behavior for the 5000 series. Areas of fine dispersed black inclusions were revealed on their fracture surfaces. These observations confirm the results of the above macrographic examinations. They may become larger in size and greater in density according to the $O_2$ content, but, as mentioned above, their influence is not significant either on the mechanical properties of the assemblies or on the deformability, since the results of the bending trials were satisfactory (complete absence of effects after bending through 180°).

It therefore follows (FIG. 1) that, for the same $O_2$ addition, a gain in performance (increase in the penetration or welding speed) remains comparable on an Ar/He mixture as on argon alone.

The addition of $O_2$ in a controlled amount (less than 2%) also makes it possible to leave out of account any particular preparation, such as grooving and separation, of workpieces up to 6 mm in thickness to be welded together.

Figure 3:
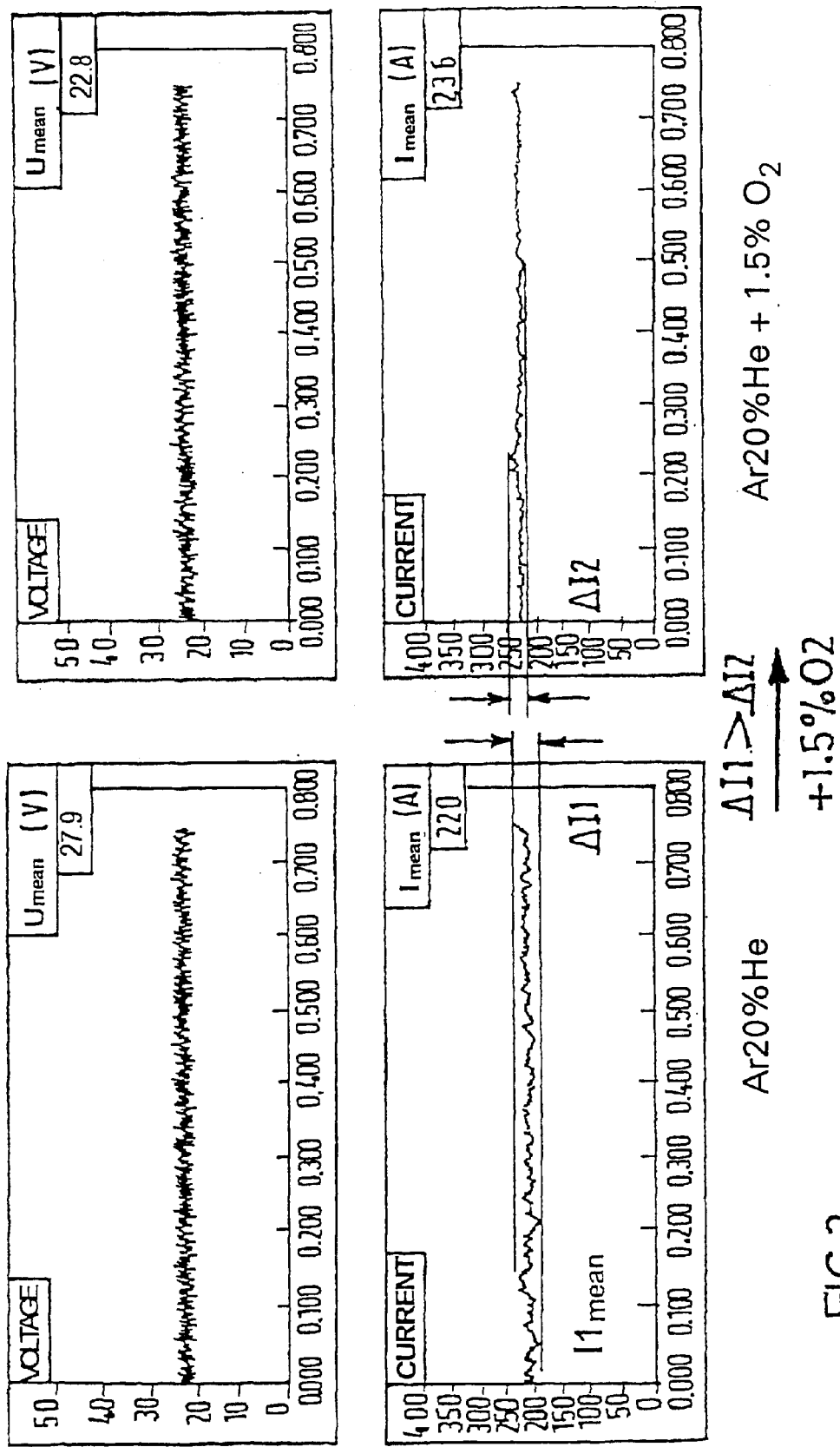
FIG. 3 shows stability of current in spray mode with argon/20% helium mixture achieved by addition of oxygen.
Figure 4:
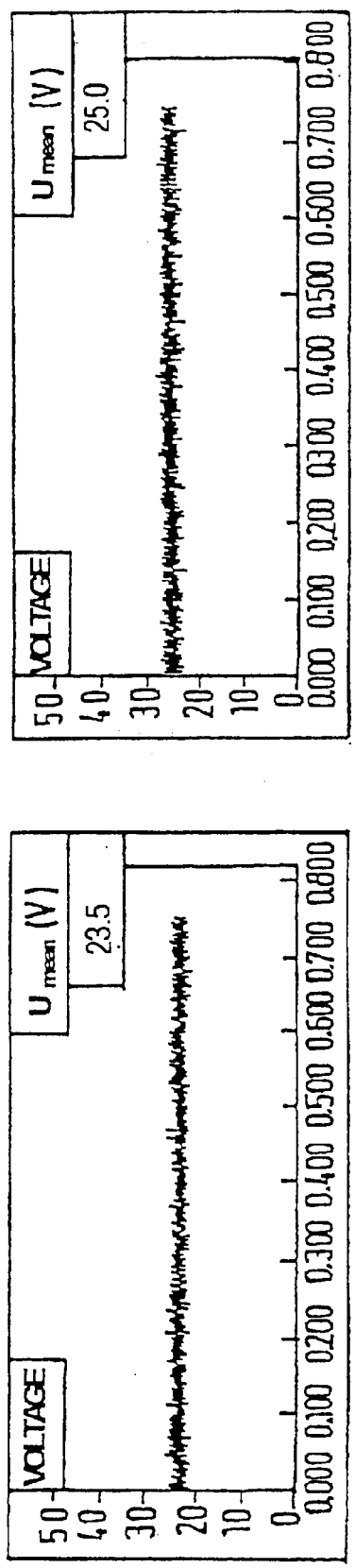
FIG. 4 shows stability of current in spray mode with argon/50% helium achieved by addition of oxygen.
Figure 4:
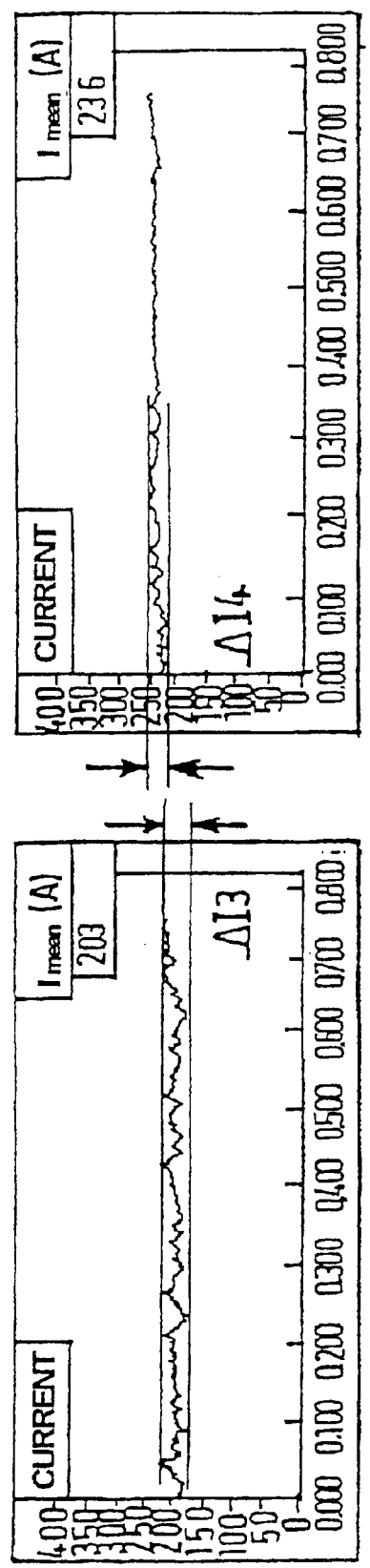

To these gains in productivity must also be added two other substantial operating advantages, namely the ease of ignition and the stability of the arc in the steady state. A comparative example shown diagrammatically in FIG. 3 demonstrates, in recordings, the substantial improvement obtained in the stability of the current in spray mode with an Ar/He/O$_2$ mixture over spray mode with Ar/He (20 to 50% helium content in both cases), that is to say without the addition of O$_2$, as shown by the comparative examples in FIGS. 3 and 4 demonstrating, in Labview recordings, the improvements in the stability of the current in spray mode for an Ar/He mixture to which oxygen has been added.

These advantages have been demonstrated not only on pure aluminum but also on 5000- and 6000-series aluminum alloys.

What is claimed is:

1. In a pulsed mode process for MIG welding of aluminum and aluminum alloys, which comprises passing a current through a meltable electrode to melt the electrode and form a welding zone, the improvement comprising the step of shielding at least part of the welding zone with a gas mixture consisting of, by volume, from 0.8% to 1.80% oxygen and from 15% to 98.20% helium, any balance being argon.

2. The process as claimed in claim 1, wherein the gas mixture consists of from 0.9% to 1.80% oxygen and from 15% to 98.20% helium, any balance being argon.

3. The process as claimed in claim 1, wherein the gas mixture contains at least 1% oxygen.

4. The process as claimed in claim 1, wherein the gas mixture contains at most 1.70% oxygen.

5. The process as claimed in claim 1, wherein the electrode comprises a solid meltable wire.

6. The process as claimed in claim 1, wherein a welding speed is from 0.25 m/min. to 2 m/min.

7. The process as claimed in claim 5, wherein the wire is fed at a speed of from 2.5 m/min. to 25 m/min.

8. The process as claimed in claim 1, wherein a mean welding current is from 40 A to 450 A.

9. The process as claimed in claim 1, wherein a mean welding voltage is from 15 V to 40 V.

10. The process as claimed in claim 1, wherein a welding current is from 120 A to 350 A and a mean welding voltage is from 19 V to 32 V.

11. In a spray mode process without current modulation for MIG welding of aluminum and aluminum alloys, which comprises passing a current through a meltable electrode to melt the electrode and form a welding zone, the improvement comprising the step of shielding at least part of the welding zone with a gas mixture consisting of, by volume, from 0.8% to 1.80% oxygen and from 15% to 98.20% helium, any balance being argon.

12. The process as claimed in claim 11, wherein the gas mixture consists of from 0.9% to 1.80% oxygen and from 15% to 98.20% helium, any balance being argon.

13. The process as claimed in claim 11, wherein the gas mixture contains at least 1% oxygen.

14. The process as claimed in wherein claim 11, the gas mixture contains at most 1.70% oxygen.

15. The process as claimed in claim 11, wherein the electrode comprises a solid meltable wire.

16. The process as claimed in claim 11, wherein a welding speed is from 0.25 m/min. to 2 m/min.

17. The process as claimed in claim 15, wherein the wire is fed at a speed of from 2.5 m/min. to 25 m/min.

18. The process as claimed in claim 11, wherein a mean welding current is from 40 A to 450 A.

19. The process as claimed in claim 11, wherein a mean welding voltage is from 15 V to 40 V.

20. The process as claimed in claim 11, wherein a welding current is from 180 A to 450 A and a mean welding voltage is from 19 V to 39 V.

* * * * *